(12) United States Patent
Choy

(10) Patent No.: US 6,821,329 B2
(45) Date of Patent: Nov. 23, 2004

(54) INK COMPOSITIONS AND METHODS OF INK-JET PRINTING ON HYDROPHOBIC MEDIA

(75) Inventor: Mark L. Choy, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 167 days.

(21) Appl. No.: 10/003,626

(22) Filed: Oct. 31, 2001

(65) Prior Publication Data

US 2003/0079652 A1 May 1, 2003

(51) Int. Cl.[7] ............................ C09D 11/02; B05D 1/32; B05D 3/02
(52) U.S. Cl. ................. 106/31.58; 106/31.49; 427/314; 427/466
(58) Field of Search ...................... 106/31.58, 31.49; 427/314, 466, 394, 337, 301

(56) References Cited

U.S. PATENT DOCUMENTS

| | | | | |
|---|---|---|---|---|
| 5,451,251 A | * | 9/1995 | Mafune et al. | 106/31.48 |
| 5,624,485 A | | 4/1997 | Calhoun | 524/386 |
| 5,766,327 A | * | 6/1998 | Maze | 106/31.58 |
| 5,788,752 A | | 8/1998 | Franks | 106/31.34 |
| 5,851,274 A | * | 12/1998 | Lin | 106/31.43 |
| 5,883,157 A | * | 3/1999 | Yamashita et al. | 523/161 |
| 5,888,287 A | | 3/1999 | Brown et al. | 106/31.58 |
| 6,004,389 A | * | 12/1999 | Yatake | 106/31.86 |
| 6,020,397 A | * | 2/2000 | Matzinger | 523/160 |
| 6,039,795 A | | 3/2000 | Fukuo et al. | 106/31.58 |
| 6,051,057 A | * | 4/2000 | Yatake et al. | 106/31.58 |
| 6,087,416 A | | 7/2000 | Pearlstine et al. | 523/160 |
| 6,221,139 B1 | * | 4/2001 | Schut | 106/31.43 |
| 6,231,654 B1 | * | 5/2001 | Elwakil | 106/31.47 |
| 6,265,481 B1 | | 7/2001 | Fies et al. | 524/594 |
| 6,270,214 B1 | | 8/2001 | Smith et al. | |
| 6,274,645 B1 | * | 8/2001 | Gundlach et al. | 523/160 |
| 6,503,978 B1 | * | 1/2003 | Tsao et al. | 524/556 |
| 6,538,047 B1 | * | 3/2003 | Miyabayashi | 523/160 |
| 2002/0038613 A1 | * | 4/2002 | Yatake | 106/31.6 |
| 2002/0144626 A1 | * | 10/2002 | Schut | 106/31.58 |
| 2002/0169232 A1 | * | 11/2002 | Yatake | 523/160 |

FOREIGN PATENT DOCUMENTS

| | | |
|---|---|---|
| EP | 0 483 610 | 5/1992 |
| EP | 0 779 347 | 6/1997 |
| EP | 0 974 626 | 1/2000 |
| EP | 1 034 940 | 9/2000 |
| EP | 1 043 369 | 10/2000 |
| EP | 1 193 301 | 4/2002 |
| EP | 1 223 046 | 7/2002 |
| EP | 1 243 435 | 9/2002 |
| WO | WO 99/50365 | 10/1999 |
| WO | WO 01/77237 | 10/2001 |

\* cited by examiner

*Primary Examiner*—Helene Klemanski
*Assistant Examiner*—Veronica F. Faison

(57) ABSTRACT

Ink and fixer compositions for printing on hydrophobic media. The ink compositions include a water soluble dye and a vehicle, the vehicle includes water, a glycol ether, a humectant, and a non-ionic surfactant. The fixer compositions include a fixing agent and a vehicle, the vehicle includes water, a glycol ether, a humectant, and a non-ionic surfactant.

Methods of printing on hydrophobic media. The methods include the steps of providing an ink that includes a water soluble dye and a vehicle, the vehicle including water, a glycol ether, a humectant, and a non-ionic surfactant; providing a hydrophobic print medium; and depositing the ink on the hydrophobic print medium. The method of printing may further include steps of applying heat to the hydrophobic print medium during and/or after the ink deposition step. The method of printing may yet further include steps of providing a fixer that includes a fixing agent and a vehicle, the vehicle including water, a glycol ether, a humectant, and a non-ionic surfactant; and depositing the fixer on the hydrophobic print medium before, after, or both before and after the ink is deposited.

30 Claims, 3 Drawing Sheets

INK COMPOSITIONS AND METHODS OF INK-JET PRINTING ON HYDROPHOBIC MEDIA

BACKGROUND OF THE INVENTION

Once an ink has been deposited on a print medium it takes a certain time for the printed image to dry. Drying is driven in part by evaporation and in part by absorption into the print medium. Short "drytimes" (e.g., less than about 1 s) are generally preferred in the printing industry as they reduce surface bleed, reduce the potential for smudging, and shorten the overall print time. The drytime of an image is influenced by a number of factors that include the chemical composition of the deposited ink and the physical and chemical characteristics of the print medium.

The rate at which an ink is absorbed into a print medium may, for example, be affected by the surface tension and viscosity of the ink. Inks with low surface tension and viscosity are absorbed more quickly into print media. Alcohols such as diols and glycols have low viscosities and low surface tensions and are therefore frequently added to ink compositions to enhance ink absorption. Surfactants are also capable of reducing the surface tension of inks and are further capable of providing a stabilizing interface between hydrophilic and hydrophobic environments. However, reducing the surface tension and viscosity of an ink increases the risk of surface bleed and may therefore have an adverse effect on print quality.

Uncoated print media are porous and therefore absorb ink fairly rapidly through capillary action. In contrast, coated print media have smooth non-porous surfaces that are less permeable to inks. As a consequence of this physical difference, when inks are deposited on coated print media they generally take longer to dry than when they are deposited on uncoated print media. The situation is further worsened when the ink and print medium are chemically incompatible (e.g., when a hydrophilic ink is deposited on a hydrophobic coating).

The coatings used in the printing industry are generally pigment rich formulations that provide improved gloss, slickness, color, printing detail, and brilliance. The pigment (e.g., china clay, barium sulfate, calcium carbonate, titanium oxide, etc.) is similar to a filler that fills the pores on the surface of the print medium. The pigments are mixed with a variety of additives (e.g., dispersants, thickeners, preservatives, defoamers, dyes, etc.) and adhesives that hold the coating to the surface of the print medium and provide a suitable finish and rub-resistance. Commonly used adhesives are latex based and include natural adhesives (e.g., starches and proteins such as casein and soya extract) and synthetic adhesives (e.g., vinyl acetate, vinyl alcohol, acrylic, and styrene-butadiene based polymers).

Water based inks are generally preferred in the ink-jet printing industry because water is readily available at low cost, chemically unreactive, non-toxic, environmentally friendly, and because the physical properties of water (e.g., boiling point, viscosity, surface tension, etc.) are ideally suited to the thermal and piezoelectric ejection of fine droplets of ink. Adhesives used in coatings for ink-jet print media are therefore usually made from water compatible hydrophilic polymers (e.g., polyvinyl alcohol).

In offset printing, an image is transferred from a printing plate (positive image) to a rubber blanket (negative image) and then to a substrate (as a positive once again). The ink-receptive image areas on the printing plate are made from a hydrophobic material, while the ink-repellent non-printing areas are made from a hydrophilic material. Inks that include hydrophobic solvents such as xylene, toluene, linseed oil, soybean oil, etc. are therefore preferred in the offset printing industry, and adhesives used in coatings for offset print media are typically made from hydrophobic polymers (e.g., styrene-butadiene based polymers).

It will be appreciated from the above discussion that commercially available ink-jet inks and commercially available offset coated print media are chemically incompatible. Furthermore, the physical properties (e.g., high viscosity) and the chemical reactivity of commercially available offset inks are not suitable for ink-jet printing methods and not compatible with ink-jet printing equipment. It would be desirable to provide ink compositions and ink-jet printing methods that allow inks to be printed by ink-jet methods on commercially available offset coated papers and hydrophobic print media in general. In particular it would be desirable to provide ink compositions that perform well in ink-jet printers on both a short and long term and show reasonable drytimes when printed on hydrophobic media.

SUMMARY OF THE INVENTION

The present invention addresses and solves the above-mentioned problems by providing ink compositions that include a water soluble dye and a vehicle, the vehicle including water, a glycol ether, a humectant, and a non-ionic surfactant. The present invention further provides fixer compositions for stabilizing inventive inks on hydrophobic media that include a fixing agent and a vehicle, the vehicle including water, a glycol ether, a glycol ether ester or mixture thereof, a humectant, and a non-ionic surfactant.

The present invention further addresses and solves the above-mentioned problems by providing methods of printing on hydrophobic media that include the steps of providing an ink that includes a water soluble dye and a vehicle, the vehicle including water, a glycol ether, a glycol ether ester or mixture thereof, a humectant, and a non-ionic surfactant; providing a hydrophobic print medium; and depositing the ink on the hydrophobic print medium. The method of printing may further include steps of applying heat to the hydrophobic print medium before, during and/or after the ink deposition step. The method of printing may yet further include steps of providing a fixer that includes a fixing agent and a vehicle, the vehicle including water, a glycol ether, a glycol ether ester or mixture thereof, a humectant, and a non-ionic surfactant; and depositing the fixer on the hydrophobic print medium before, after, or both before and after the ink is deposited.

DETAILED DESCRIPTION

Figure 1:
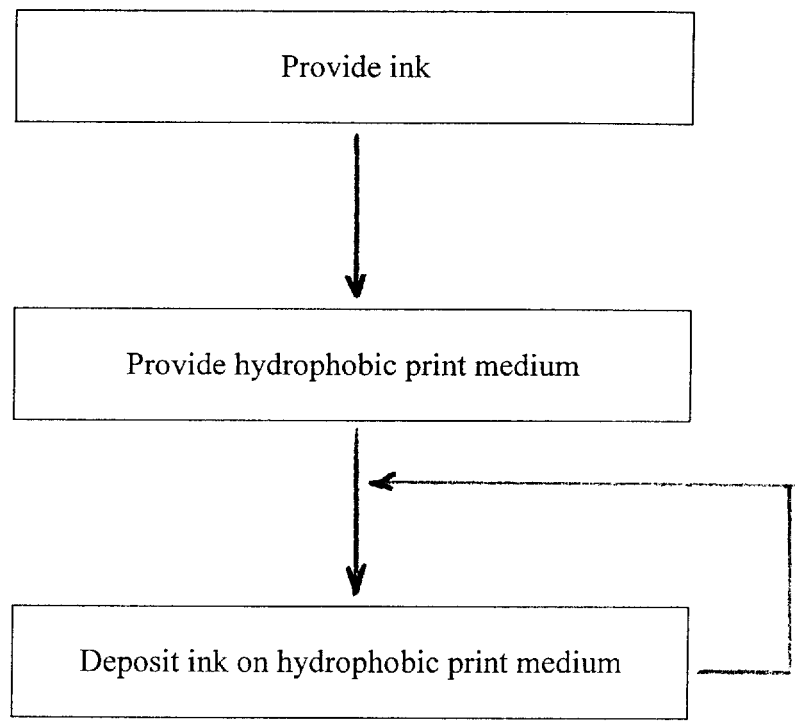
FIG. 1 is a flow chart depicting the simplest steps involved in a method of the present invention.

The invention will first be described with reference to inventive ink and fixer compositions and the materials therein. The invention will then be described with reference to inventive methods of printing on hydrophobic media.

Ink and Fixer Compositions

Exemplary embodiments of the ink and fixer compositions comprise, by weight (all percents are by weight unless otherwise indicated) from 0.1 to 50%, preferably from 5 to 15% glycol ether, glycol ether ester or mixture thereof; from 1 to 20%, preferably from 5 to 15% humectant; and from 0.1 to 10%, preferably from 0.5 to 3% non-ionic surfactant. The ink compositions further include from 0.1 to 10%, preferably from 2 to 4% water soluble dye, while the fixer compositions further comprise from 0.1 to 20%, preferably from 2 to 4% fixing agent.

The remainder of the ink and fixer compositions are mostly water; however, other components such as biocides that inhibit growth of microorganisms, chelating agents such as EDTA that eliminate deleterious effects of heavy metal impurities, buffers, ultraviolet absorbers, corrosion inhibitors, and viscosity modifiers may be added to improve various properties of the ink and fixer compositions.

In preferred embodiments of the invention, the ink compositions comprise, by weight, about 10% glycol ether, glycol ether ester or mixture thereof, about 10% humectant, about 1% non-ionic surfactant, and about 3% water soluble dye; the fixer compositions comprise, by weight, about 10% glycol ether, glycol ether ester or mixture thereof, about 10% humectant, about 1% non-ionic surfactant, and about 3% fixing agent.

Glycol Ethers and Glycol Ether Esters

One or more glycol ethers or glycol ether esters may be used to prepare the ink and fixer compositions of the present invention. Exemplary glycol ethers suitable for this purpose include, but are not limited to, ethylene glycol ethers, diethylene glycol ethers, triethylene glycol ethers, propylene glycol ethers, dipropylene glycol ethers, tripropylene glycol ethers.

Exemplary glycol ethers esters suitable for this purpose include, but are ot limited to, ethylene glycol ether acetates, diethylene glycol ether acetates, propylene glycol ether acetates, and dipropylene glycol ether acetates.

A range of glycol ethers and glycol ether esters are available commercially (e.g., from Dow Chemical Company, Eastman Chemical Company, Equistar Chemical Company, Shell Chemical Company, Lyondell Chemical Company, and Union Carbide Corporation) under trademarked family names (e.g., CELLOSOLVE™, OXITOL™, CARBITOL™, DIOXITOL™, DOWANOL™, PROXITOL™, PROPASOL™, ARCOSOLV™, UCAR™, and POLY-SOLV™). These include ethylene glycol methyl ether, ethylene glycol ethyl ether, ethylene glycol propyl ether, ethylene glycol butyl ether, ethylene glycol hexyl ether, ethylene glycol 2-ethylhexyl ether, ethylene glycol phenyl ether, diethylene glycol methyl ether, diethylene glycol ethyl ether, diethylene glycol propyl ether, diethylene glycol butyl ether, diethylene glycol hexyl ether, triethylene glycol methyl ether, triethylene glycol ethyl ether, triethylene glycol propyl ether, triethylene glycol butyl ether, ethylene glycol ethyl ether acetate, ethylene glycol butyl ether acetate, diethylene glycol ethyl ether acetate, diethylene glycol butyl ether acetate, propylene glycol methyl ether, propylene glycol ethyl ether, propylene glycol propyl ether, propylene glycol butyl ether, propylene glycol phenyl ether, dipropylene glycol methyl ether, dipropylene glycol propyl ether, dipropylene glycol butyl ether, dipropylene glycol dimethyl ether, tripropylene glycol methyl ether, tripropylene glycol propyl ether, tripropylene glycol butyl ether, propylene glycol methyl ether acetate , and dipropylene glycol methyl ether acetate.

In certain preferred embodiments, the glycol ethers or glycol ether esters exhibit a balance of hydrophilic and hydrophobic character. Preferred glycol ethers that may be employed in the practice of this invention include ethylene glycol butyl ether, propylene glycol propyl ether. Preferred glycol ethers that may be employed in the practice of this invention include ethylene glycol ethyl ether acetate, and propylene glycol methyl ether acetate. The total concentration of glycol ether, glycol ether ester or mixture thereof may range from 0.1 to 50 wt %, more preferably from 2 to 25 wt %, most preferably from 5 to 15 wt %.

Humectants

One or more humectants may be used to prepare the ink and fixer compositions of the present invention. Humectants maintain the ink or fixer water content in a narrow range regardless of humidity fluctuations and are therefore commonly added to ink-jet inks in order to prevent clogging of narrow ink-jet pen nozzles. In a preferred embodiment, the humectants are water-soluble. Exemplary water-soluble humectants suitable for this purpose include, but are not limited to, heterocyclic ketones (e.g., 2-pyrrolidone, N-methyl-pyrrolid-2-one, 1,3-dimethyl-imidazolid-2-one, octyl-pyrrolidone, etc.); glycols (e.g., ethylene glycol, diethylene glycol, triethylene glycol, tetraethylene glycol, propylene glycol, polyethylene glycol, polypropylene glycol, etc.); glycerols; and diols (e.g., butanediol, pentanediol, hexanediol, etc.). The total concentration of humectant may range from 1 to 20 wt %, more preferably from 3 to 17 wt %, most preferably from 5 to 15 wt %.

Non-ionic Surfactants

One or more non-ionic surfactants may be employed in the composition of an ink or fixer of the present invention. In certain embodiments, the non-ionic surfactants are water soluble. Exemplary water soluble non-ionic surfactants suitable for this purpose include, but are not limited to, organo-silicone surfactants and derivatives of polyethylene oxides (POEs) including alkyl POEs, alkyl phenyl POEs, hydroxylated or alkoxylated acetylenic POEs, POE esters, POE amines, POE amides, and polyethylene oxide and polypropylene oxide copolymers. A range of POEs are available commercially (e.g., from Union Carbide Corporation, ICI Group, Rhone-Poulenc Company, Rohm & Haas Company, BASF Group, and Air Products Incorporated) under trademarked family names (e.g., TERGITOL™, BRIJ™, TRITON™, PLURONIC™, PLURAFAC™, IGEPALE™, and SURFYNOL™). Organo-silicones are also available commercially from Crompton Corporation under the trademarked family name SILWET™. Other non-ionic surfactants including members of the MACKAM™ family of octylamine choloroacetic adducts from the McIntyre Group; members of the FLUORAD™ family of fluoro surfactants from 3M; and members of the ALKAMUL™ and ALDAMIDE™ families of fatty acid and fatty amide ethoxylates from Rhone-Poulenc may also be employed in the composition of an ink or fixer of the present invention.

Preferred surfactants that may be employed in the practice of this invention include TERGITOL™ 15-S-3, 15-S-5, and 15-S-7; SILWET™ L-7607, L-7600, L-7605, L-7644, L-7657, and L-77; and SURFYNOL™ CT-111. The ink and fixer composition of the present invention comprises by weight from 0.1 to 10%, more preferably from 0.3 to 5%, most preferably from 0.5 to 3%, non-ionic surfactant.

Water Soluble Dyes

One or more water soluble dyes may be employed in the composition of an ink of the present invention. The term "water-soluble" as used herein, refers to dyes whose solubility limit in water is sufficiently high so as to produce desired color saturation of printed images. Generally, a solubility limit in water exceeding 2 wt % will meet most desired color saturation goals. It should be understood that any dye (e.g., reactive dye, direct dye, acid dye, basic dye, vat dye, metal complex dye, mordant dye, etc.), now known or hereinafter developed, can be used to practice the invention, as long as such dye has suitable characteristics. Suitable characteristics include good hue, high chroma, acceptable photofade characteristics, sufficiently high optical densities, sufficient solubilities in the ink vehicle, good saturation performance, and compatibility with other ink-composition components. Moreover, suitable dyes do not detract from the use of the ink composition for the production of ink-jet printed images.

Water soluble dyes provide a number of reliability and stability advantages over water insoluble pigment based colorants, particularly in the water based ink-jet printing industry. For example, water soluble dyes are more stable during ink-jet firing and less likely to form insoluble crusts and precipitates that can block the print head nozzles. In addition, water soluble dyes are easily prepared and then formulated into water based vehicles, in particular there are no pre-formulation steps involved (e.g., pigment grinding) and no need for the dispersants that are commonly used to promote pigment solubility). The ink composition of the present invention preferably comprises by weight from 0.1 to 10%, more preferably from 0.5 to 6%, most preferably from 2 to 4% water soluble dye.

Fixing Polymers

One or more fixing agent may be employed in the composition of a fixer of the present invention. Fixers are commonly printed over, under, or both over and under inks to bond them to the printed medium and/or to increase waterfastness and smudgefastness. The underlying idea is to bind charged dyes with oppositely charged species. For example, a suitably charged fixing agent (e.g., a cationic polymer) in the fixer can immobilize an oppositely charged dye (e.g., an anionic dye) in the ink through electrostatic interactions. For anionic dyes, the following cationic polymers can be used as fixing agents: quaternized polyethyleneimines, quaternized polyvinylpyrrolidone, and quaternized polyallylamine. For cationic dyes, polyvalent salts of calcium, magnesium, barium, and aluminum can be used as fixing agents. The fixer composition of the present invention preferably comprises by weight from 0.1 to 20%, more preferably from 0.5 to 10%, most preferably from 2 to 4% fixing agent.

Methods of Printing on Hydrophobic Media

The present invention also provides methods of printing inventive inks and fixers on hydrophobic media. The hydrophobic medium may itself be a hydrophobic material. Alternatively, the hydrophobic medium may include a hydrophilic substrate with a surface that is coated with a hydrophobic material. The hydrophilic substrate may be a cellulosic material such as paper. The hydrophobic coating material may include a hydrophobic polymer or a mixture of hydrophobic polymers. Any hydrophobic polymer used in commercial coated papers (e.g., coated offset paper) can be used in the present invention. The hydrophobic coating material may, for example, include a styrene-butadiene polymer, an acrylic polymer, or a vinyl acetate polymer.

In preferred embodiments, the inventive printing methods use ink-jet printing equipment and processes (i.e., commercially available ink-jet pens and printers). The ink-jet printing process involves the ejection of fine droplets of ink onto a print medium in response to electrical signals generated by a microprocessor. Typically, an ink-jet printer utilizes a pen set mounted on a carriage that is moved relative to the surface of the print medium. A pen set of the present invention may, for example, include five pens (cyan ink, magenta ink, yellow ink, black ink, and fixer). Each pen includes a print head with orifice plates that have very small nozzles (typically 10–50 $\mu$m diameter) through which the ink or fixer droplets are ejected. Adjacent to these nozzles are chambers where ink or fixer is stored prior to ejection. Drop ejection is currently achieved either thermally or piezoelectrically. In thermal ink-jet printing, each nozzle is associated with a resistor element. Each resistor element is in turn connected to a microprocessor, whose signals direct one or more resistor elements to heat up rapidly. This causes a rapid expansion of ink or fixer vapor that forces a drop through the associated nozzle onto the print medium. In piezoelectric ink-jet printing, droplets are ejected due to the vibrations of piezoelectric crystals stimulated by electrical signals generated by the microprocessor.

Interactions between the ink or fixer and the pen architecture (e.g. the resistor element, nozzle, etc.) strongly influence the reliability of pen performance. Examples of these interactions include corrosion due to the presence of metal ion impurities or other reactive components in the ink composition; kogation, defined as the build up of residue on the surface of resistor elements; puddling, defined as the formation of ink puddles on the orifice plates of the print head; crusting, defined as the formation of insoluble crusts on the orifice plates of the print head; and swelling of the structural adhesive (typically an epoxy adhesive) that holds the print head to the pen body. The chemical compositions of the inks and fixer play an important role in determining the extent of these unwanted phenomena. In preferred embodiments of the present invention, the inks and fixer do not lead to substantial corrosion, kogation, puddling, crusting, or structural adhesive swell and hence do not affect the short and long term reliability of pen performance.

Figure 2:
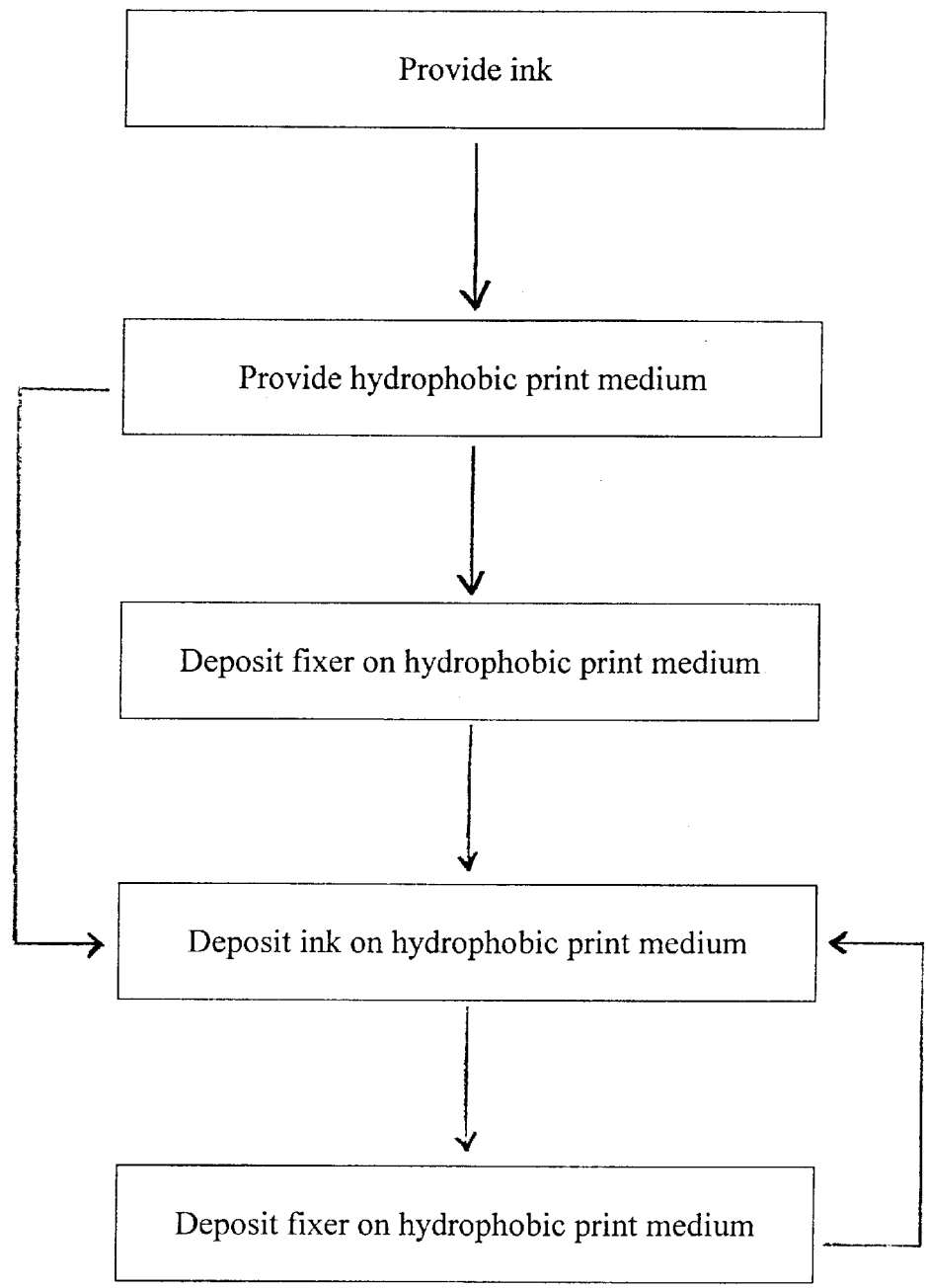
FIG. 2 is a flow chart depicting optional heating steps that may be included in a method of the present invention.

Once the inks and fixer of this invention have been placed in separate ink-jet pens and a hydrophobic print medium has been provided, the inks and fixer can be deposited on the hydrophobic print medium on the same pass or different passes (see FIGS. 1 and 2). For example, the fixer may be used to under-coat the inks to improve binding of the ink to the print medium. Additionally or alternatively, the fixer can be used to over-coat the inks to improve waterfastness and smudgefastness. If the printing is to be conducted in several passes the inks (I) and fixer (F) can be deposited in a multilayered fashion, that is, F-I-F-I-F-I, etc. It will further be appreciated that inks of different color (e.g., cyan (C), magenta (M), and yellow (Y)) can be deposited on the same pass or different passes and that they can be deposited in a multilayered fashion with or without additional deposition of fixer, that is, C-M-Y, F-C-M-Y-F, F-C-F-M-F-Y-F, etc. It is to be understood that the fixer of the present invention need not necessarily be deposited onto the hydrophobic medium by ink-jet printing methods (i.e., by ejection from an ink-jet pen). The fixer may, for example, be deposited on the hydrophobic medium using rollers that have been impregnated with fixer.

Figure 3:
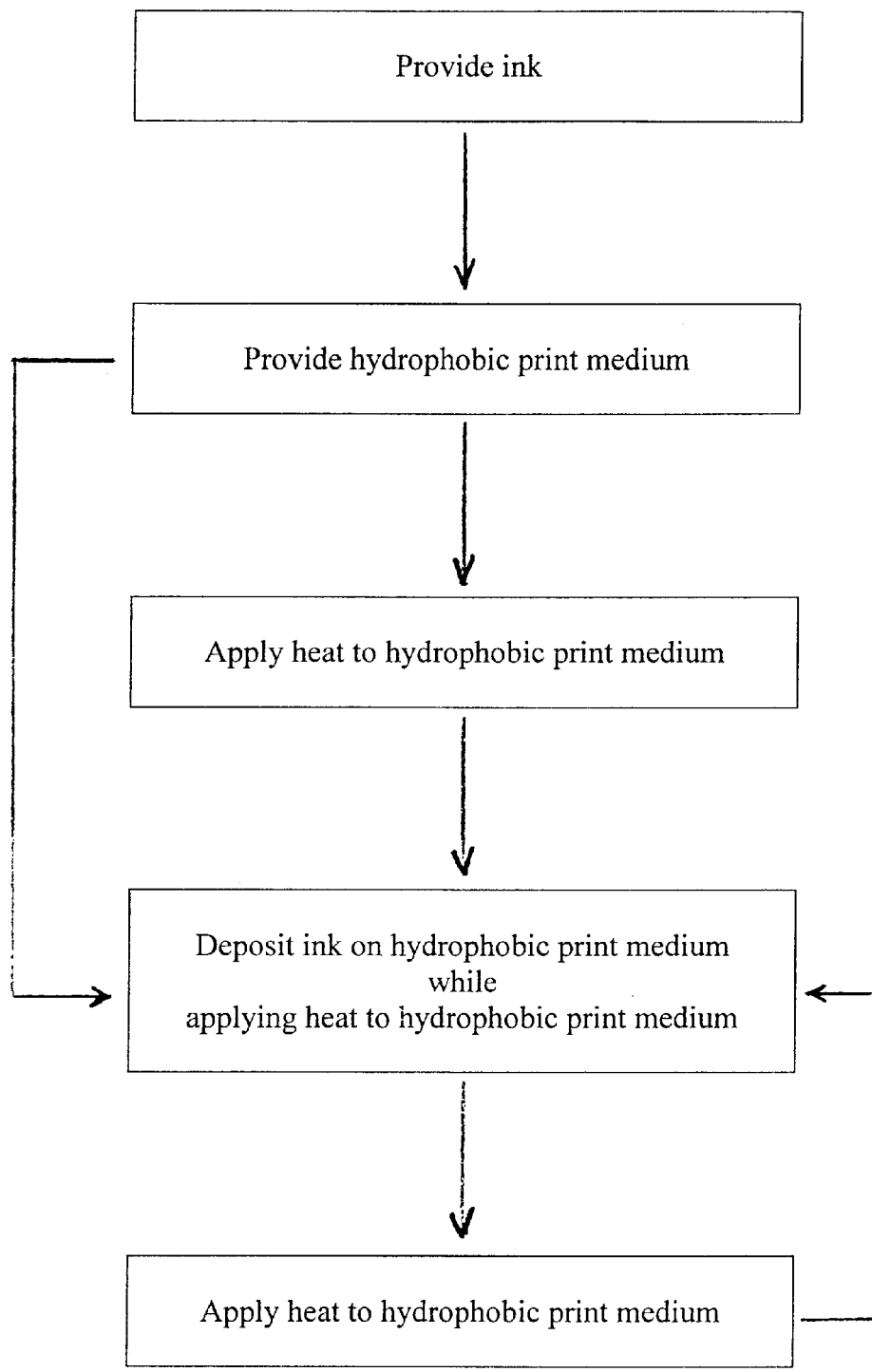
FIG. 3 is a flow chart depicting optional fixer deposition steps that may be included in a method of the present invention.

In certain embodiments, it may be preferable to heat the hydrophobic medium while the inks and/or fixer are being deposited on the hydrophobic print medium (see FIG. 3). Heating will increase the rate at which the ink and/or fixer vehicle evaporates and will hence reduce the drytime. The hydrophobic medium could be heated by, for example, blowing hot air directly onto the print medium. Alternatively or additionally, the hydrophobic medium could be heated by irradiation (e.g., infra-red radiation) or by using heated rollers. It will be appreciated that the hydrophobic medium could also be pre-heated prior to ink and/or fixer deposition.

To reduce drytime yet further, the hydrophobic medium could also be heated for a fixed time once the inks and/or fixer have been deposited. The drytime (see Examples for a definition of drytime) will preferably be shorter than 30 seconds, more preferably shorter than 20 seconds, yet more preferably less than 10 seconds, and most preferably less than 5 seconds. It will be appreciated that the hydrophobic medium may be heated in between ink and/or fixer deposition steps or alternatively the hydrophobic medium may be heated once all the ink and/or fixer deposition steps have been completed.

EXAMPLES

In order to further illustrate the invention, some exemplary ink compositions are set forth below. Three inventive ink compositions (Inks # 1, # 2, and # 3) were prepared as shown in Table 1 (all values are weight percentages unless otherwise indicated):

TABLE 1

| Ink compositions (wt %) | | | |
| --- | --- | --- | --- |
| Ink # | 1 | 2 | 3 |
| propylene glycol propyl ether | 10 | 10 | — |
| propylene glycol methyl ether acetate | — | — | 10 |
| 2-pyrrolidone | 10 | 10 | 10 |
| organo-silicone surfactant | 1 | — | — |
| alkyl polyethylene oxide | — | 1 | 1 |
| water soluble dye | 3 | 2 | 2 |
| water | 76 | 77 | 77 |

Empty default color pens for the HP 2000C PROFESSIONAL SERIES™ ink-jet printer were filled with each of the ink compositions of Table 1 (two pens for each of the inks). A drytime test was then performed with each pen on three commercial offset coated papers using an HP 2000C PROFESSIONAL SERIES™ ink-jet printer. The three offset coated papers used were LUSTRO™ laser gloss (S. D. Warren), KROMECOTE™ (Champion Papers), and UTOPIA™ dull (Appleton Papers). The test was also performed using the default cyan, magenta, and yellow color ink-jet ink pens that are sold with the HP 2000C PROFESSIONAL SERIES™ ink-jet printer (i. e., HP No.10 C4801A, C4802A, and C4803A).

A solid bar pattern (approximate size 7 inch×0.5 inch) was first printed in a four-pass print-mode. The ink density for this pattern was approximately 128 picoliters/300 dots/inch pixel. An HG-201A MASTER HEAT GUN™ (Master Appliance Corporation) positioned approximately 12–18 inches from the print zone was used on the highest setting during the printing and drying process. Once the plot was completed and after a drying delay, 10 sheets of the same type of coated media were placed upon the solid bar pattern. The whole procedure was repeated for a range of drying delays (from 5 to 40 or 60 seconds) and the "drytime" was defined as the drying delay beyond which no or a minimal amount of ink was transferred to the 10 sheets of coated media after stacking.

When the default HP 2000C PROFESSIONAL SERIES™ ink-jet inks were tested, the inks remained wet even after 40–60 seconds of drying. In contrast, the inventive inks 1–3 were dry within 10–20 seconds. The average drytimes (in seconds) obtained for the various inventive ink and coated paper combinations are shown in Table 2:

TABLE 2

| | Drytimes (seconds) | | |
| --- | --- | --- | --- |
| Ink # | 1 | 2 | 3 |
| LUSTRO ™ | 20 | 20 | 14 |
| UTOPIA ™ | 21 | 20 | 20 |
| KROMCOTE ™ | 12 | 16 | 14 |

Other Embodiments

Other embodiments of the invention will be apparent to those skilled in the art from a consideration of the specification or practice of the invention disclosed herein. It is intended that the specification and examples provided herein be considered as exemplary only, with the true scope of the invention being indicated by the following claims.

What is claimed is:

1. A method of printing on a hydrophobic medium comprising steps of:
providing an ink that comprises a water soluble dye and a vehicle, the vehicle including water, a glycol ether, a humectant, and a non-ionic surfactant;
providing a hydrophobic print medium; and
depositing the ink on the hydrophobic print medium.

2. The method of claim 1, further comprising the step of applying heat to the hydrophobic print medium before the ink deposition step.

3. The method of claim 1, further comprising the step of applying heat to the hydrophobic print medium during the ink deposition step.

4. The method of claim 1, further comprising the step of applying heat to the hydrophobic print medium after the ink deposition step.

5. The method of claim 1, wherein the step of depositing the ink is performed by thermal or piezoelectric ink-jet printing.

6. The method of claim 1, wherein the hydrophobic print medium includes a substrate with a surface that is coated with a hydrophobic polymeric material.

7. The method of claim 6, wherein the substrate is a cellulosic material.

8. The method of claim 6, wherein the polymeric material is selected from the group consisting of styrene butadiene polymers, acrylic polymers, and vinyl acetate polymers.

9. A method of printing on a hydrophobic medium comprising steps of:
providing an ink that comprises a water soluble dye and a vehicle, the vehicle including water, a glycol ether, a humectant, and a non-ionic surfactant;
providing a fixer that comprises a fixing agent and a vehicle, the vehicle including water, a glycol ether, a humectant, and a non-ionic surfactant;
providing a hydrophobic print medium;
depositing the ink on the hydrophobic print medium; and
depositing the fixer on the hydrophobic print medium.

10. The method of claim 9, wherein the step of depositing the fixer on the hydrophobic print medium is performed before the step of depositing the ink on the hydrophobic print medium.

11. The method of claim 9, wherein the step of depositing the fixer on the hydrophobic print medium is performed after the step of depositing the ink on the hydrophobic print medium.

12. The method of claim 9, wherein the step of depositing the fixer on the hydrophobic print medium is performed both before and after the step of depositing the ink on the hydrophobic print medium.

13. The method of claim 9, further comprising the step of applying heat to the hydrophobic print medium before the ink and fixer deposition steps.

14. The method of claim 9, further comprising the step of applying heat to the hydrophobic print medium during at least one of the ink and fixer deposition steps.

15. The method of claim 9, further comprising the step of applying heat to the hydrophobic print medium after at least one of the ink and fixer deposition steps.

16. The method of claim 1, wherein the glycol ether is selected from the group consisting of ethylene glycol ethers, diethylene glycol ethers, triethylene glycol ethers, ethylene glycol ether acetates, diethylene glycol ether acetates, propylene glycol ethers, dipropylene glycol ethers, tripropylene glycol ethers, propylene glycol ether acetates, and dipropylene glycol ether acetates.

17. The method of claim 16, wherein the glycol ether is selected from the group consisting of ethylene glycol methyl ether, ethylene glycol ethyl ether, ethylene glycol propyl ether, ethylene glycol butyl ether, ethylene glycol hexyl ether, ethylene glycol 2-ethylhexyl ether, ethylene glycol phenyl ether, diethylene glycol methyl ether, diethylene glycol ethyl ether, diethylene glycol propyl ether, diethylene glycol butyl ether, diethylene glycol hexyl ether, triethylene glycol methyl ether, triethylene glycol ethyl ether, triethylene glycol propyl ether, triethylene glycol butyl ether, ethylene glycol ether acetate, ethylene glycol butyl ether acetate, diethylene glycol ethyl ether acetate, diethylene glycol butyl ether acetate, propylene glycol methyl ether, propylene glycol ethyl ether, propylene glycol propyl ether, propylene glycol butyl ether, propylene glycol phenyl ether, dipropylene glycol methyl ether, dipropylene glycol propyl ether, dipropylene glycol butyl ether, dipropylene glycol dimethyl ether, tripropylene glycol methyl ether, tripropylene glycol propyl ether, tripropylene glycol butyl ether, propylene glycol methyl ether acetate, and dipropylene glycol methyl ether acetate.

18. The method of claim 17, wherein the glycol ether is selected from the group consisting of ethylene glycol butyl ether, propylene glycol propyl ether, ethylene glycol ethyl ether acetate, and propylene glycol methyl ether acetate.

19. The method of claim 1, wherein the humectant is selected from the group consisting of 2-pyrrolidone, N-methyl-pyrrolid-2-one, 1,3-dimethyl-imidazolid-2-One, and octyl-pyrrolidone.

20. The method of claim 1, wherein the humectant is selected from the group consisting of ethylene glycol, diethylene glycol, triethylene glycol, tetraethylene glycol, propylene glycol, polyethylene glycol, and polypropylene glycol.

21. The method of claim 1, wherein the humectant is selected from the group consisting of butanediol, pentanediol, and hexanediol.

22. The method of claim 1, wherein the humectant is a glycerol.

23. The method of claim 1, wherein the nonionic surfactant is an organo-silicone surfactant.

24. The method of claim 1, wherein the nonionic surfactant is selected from the group consisting of alkyl polyethylene oxides, alkyl phenyl polyethylene oxides, hydroxylated acetylenic polyethylene oxides, alkoxylated polyethylene oxides, polyethylene oxide esters, polyethylene oxide amines, polyethylene oxide amides, and polyethylene oxide polypropylene oxide copolymers.

25. The method of claim 1, wherein the concentration of glycol ether is from about 5 to about 15 wt %, the concentration of humectant is from about 5 to about 15 wt %, the concentration of non-ionic surfactant is from about 0.5 to about 3 wt %, and the concentration of water soluble dye is from about 2 to about 4 wt %.

26. The method of claim 1, wherein the concentration of glycol ether is about 10 wt %, the concentration of humectant is about 10 wt %, the concentration of non-ionic surfactant is about 1 wt %, and the concentration of water soluble dye is about 3 wt %.

27. The method of claim 9, wherein the fixing agent is selected form the group consisting of cationic polymers and anionic polymers.

28. The method of claim 9, wherein the fixing agent is a salt of a polyvalent ion.

29. The method of claim 9, wherein the concentration of glycol ether in the ink and fixer is from about 5 to about 15 wt %, the concentration of humectant in the ink and fixer is from about 5 to about 15 wt %, the concentration of non-ionic surfactant in the ink and fixer is from about 0.5 to about 3 wt %, and the concentration of fixing agent in the fixer is from about 2 to about 4 wt %.

30. The method of claim 29, wherein the concentration of glycol ether in the ink and fixer is about 10 wt %, the concentration of humectant in the ink and fixer is about 10 wt %, the concentration of non-ionic surfactant in the ink and fixer is about 1 wt %, and the concentration of fixing agent in the fixer is about 3 wt %.

* * * * *

UNITED STATES PATENT AND TRADEMARK OFFICE
CERTIFICATE OF CORRECTION

PATENT NO. : 6,821,329 B2
DATED : November 23, 2004
INVENTOR(S) : Choy

It is certified that error appears in the above-identified patent and that said Letters Patent is hereby corrected as shown below:

Column 10,
Line 31, delete "form" and insert therefor -- from --.

Signed and Sealed this

Sixth Day of September, 2005

JON W. DUDAS
*Director of the United States Patent and Trademark Office*